US008089714B2

(12) United States Patent
Shitara et al.

(10) Patent No.: US 8,089,714 B2
(45) Date of Patent: Jan. 3, 2012

(54) DETERIORATION DETECTION METHOD OF COMPOSITE MAGNETIC HEAD AND MAGNETIC DISK INSPECTION APPARATUS

(75) Inventors: Kenichi Shitara, Kamisato (JP); Takao Ishii, Ninomiya (JP)

(73) Assignee: Hitachi High-Technologies Corporation, Tokyo (JP)

( * ) Notice: Subject to any disclaimer, the term of this patent is extended or adjusted under 35 U.S.C. 154(b) by 0 days.

(21) Appl. No.: 12/830,008

(22) Filed: Jul. 2, 2010

(65) Prior Publication Data

US 2011/0002060 A1 Jan. 6, 2011

(30) Foreign Application Priority Data

Jul. 6, 2009 (JP) ................... 2009-159614

(51) Int. Cl.
*G11B 27/36* (2006.01)
(52) U.S. Cl. ............... 360/31; 360/46; 360/66; 360/68; 360/75; 360/77.02
(58) Field of Classification Search .............. None
See application file for complete search history.

(56) References Cited

U.S. PATENT DOCUMENTS

| | | | | |
|---|---|---|---|---|
| 5,790,334 A * | 8/1998 | Cunningham | ................. | 360/66 |
| 6,067,200 A * | 5/2000 | Ohba et al. | ..................... | 360/66 |
| 6,359,433 B1 * | 3/2002 | Gillis et al. | ................... | 324/210 |
| 6,822,815 B2 * | 11/2004 | Lim et al. | ........................ | 360/31 |
| 7,130,143 B1 * | 10/2006 | Tretter | ............................ | 360/66 |
| 7,630,159 B2 * | 12/2009 | O'Brien et al. | ................. | 360/66 |
| 7,657,826 B2 * | 2/2010 | Imamura et al. | ............. | 714/799 |
| 2006/0152838 A1 * | 7/2006 | Fitzgerald et al. | ............. | 360/46 |
| 2006/0184859 A1 * | 8/2006 | Jibry et al. | ..................... | 714/769 |
| 2007/0014041 A1 * | 1/2007 | Lille et al. | ......................... | 360/6 |
| 2007/0025005 A1 * | 2/2007 | Shimizu | .......................... | 360/31 |
| 2007/0188167 A1 * | 8/2007 | Sasaki et al. | ................... | 324/210 |
| 2008/0151435 A1 * | 6/2008 | Takahashi | ..................... | 360/313 |
| 2009/0147408 A1 * | 6/2009 | Yamasaki | ..................... | 360/313 |

FOREIGN PATENT DOCUMENTS

JP 2004-022119 1/2004
JP 2006-260652 9/2006

* cited by examiner

*Primary Examiner* — Dismery Mercedes
(74) *Attorney, Agent, or Firm* — Brundidge & Stanger, P.C.

(57) ABSTRACT

An object of the present invention is to provide a deterioration detection method of a head and a magnetic disk inspection apparatus in which the number of times of exchanging the head due to deterioration is decreased to improve the throughput of an inspection. In the present invention, a resistance value detecting circuit that is directly coupled to both terminals of an MR head is provided to measure the resistance value of the MR head, and the measured value is compared with the initial value of the exchanged head, so that it is possible to recognize a deterioration state of each head irrespective of a magnetic disk as a measurement target.

10 Claims, 3 Drawing Sheets

DETERIORATION DETECTION METHOD OF COMPOSITE MAGNETIC HEAD AND MAGNETIC DISK INSPECTION APPARATUS

BACKGROUND OF THE INVENTION

The present invention relates to a deterioration detection method of a composite magnetic head and a magnetic disk inspection apparatus, and specifically to a deterioration detection method of a head in which the number of times of exchanging a composite magnetic head (hereinafter, referred to as a head) due to deterioration is reduced to improve the throughput in an inspection of a magnetic disk in a magnetic disk inspection apparatus using the composite magnetic head including an MR (magnetoresistance effect) head (read head) and a thin-film inductive head (write head).

In recent years, the density of a magnetic disk has been rapidly increased, and an HDD compliant with hundreds of gigabytes to terabytes is mainly used nowadays. With such a high recording density of the magnetic disk, the floating amount of a magnetic head has been decreased.

A slider smaller than 1 mm square is attached to a tip end of a suspension spring with a size of 15 mm to 20 mm in these days, and a distance between a thin-film magnetic head and a disk becomes smaller to few nm to 10 nm.

Performances of such a magnetic head and a head for reading and writing data (magnetic head assembly) are precisely inspected at a manufacturing stage by respective inspection apparatuses.

Especially, for magnetic disk media of a perpendicular magnetic recording-type, a head with a TMR (Tunnel Magnetoresistance) head or a GMR (Giant Magnetoresistance) head is used as an MR head, a distance between the head and the media is set at 10 nm or smaller, and the distance is controlled in some apparatuses.

In an electric inspection of the performance of the magnetic disk, test data is written or read into/from a predetermined track by the head, and the voltage level thereof is evaluated in many cases. Therefore, fluctuations in characteristics due to deterioration of the head cause a problem in the inspection of the magnetic disk.

The composite magnetic disk (hereinafter, referred to as the head) is formed by a thin film forming process, and is fixed to a head slider. The MR head is smaller in shape than an inductive head on the recording side, and a head gap thereof is small. Accordingly, the MR head is vulnerable to various defects such as resistance defects, insulation defects with a shield, and electric characteristic defects, and the head tends to deteriorate in a short term depending on the quality of the MR head.

In addition, in the present situation where a distance between the head and the disk becomes smaller to few nm to ten nm, the head tends to be brought in contact with a recording surface, and stress is applied to the head by the contact or collision. Thus, the head as well as the MR head tends to deteriorate in a short term.

In terms of deterioration of a head, there is known a technique in which fluctuations in characteristics of a head are detected by comparing the gain of AGC for amplifying a read signal from the head at a certain level with a comparison reference value (Japanese Patent Application Laid-Open No. 2004-22119). Further, there is known a technique in which when noise exceeding an acceptable level is generated by detecting a noise signal in a read signal for detecting deterioration of a head, it is determined that the head is deteriorated and the head is magnetized (Japanese Patent Application Laid-Open No. 2006-260652).

SUMMARY OF THE INVENTION

As described in Japanese Patent Application Laid-Open No. 2004-22119, fluctuations in characteristics due to the deterioration of the head gradually progress in general. Thus, if the head is inspected using a data reading error, the deterioration of the head cannot be detected unless the deterioration of the head considerably progresses. Therefore, the deterioration of the head cannot be detected at an early stage by detection using the reading error. Thus, the yield rate of the magnetic disk is decreased or the number of retry processes is increased due to reduction in the output level of the head caused by the deterioration of the head, leading to a prolonged inspection time.

Accordingly, the following countermeasures have been taken from the past: when it is found that the level of a read signal is smaller than a predetermined reference value by confirming the level, the head is exchanged for another; or the head that has been used over a certain period of time is exchanged for another, or the head that has been inspected is periodically exchanged for another at a predetermined period.

In the former case, however, the deterioration of the head cannot be accurately determined because the level of the read signal is dependent on the characteristics of a disk to be inspected. Further, the exchange of the head at a certain period of time or at a predetermined period in the latter case is carried out long before the head is deteriorated in consideration of safety. Accordingly, the number of times of exchanging the head is disadvantageously increased as compared to that due to deterioration of the head. In addition, the progression rate of the deterioration of the head differs depending on the quality of the MR head and contact or collision of the head with a recording surface of the magnetic disk, and thus the exchange of the head in the latter case causes a problem.

Further, it is necessary to interrupt the test of the magnetic disk when the head is exchanged, and thus, an increase in the number of times of exchanging the head results in a decrease in the throughput of the inspection process.

In order to solve the problem involved in the conventional technique, an object of the present invention is to provide a deterioration detection method of a head and a magnetic disk inspection apparatus in which the number of times of exchanging the head due to deterioration is decreased to improve the throughput of an inspection of a magnetic disk.

In order to achieve the object, the present invention provides a deterioration detection method of a head and a magnetic disk inspection apparatus, wherein a resistance value of the MR head is detected by a resistance value detecting circuit coupled to both terminals of the MR head, the resistance value of the MR head of the exchanged composite magnetic head is measured through the resistance value detecting circuit and a measured value is stored into a memory as an initial value, the resistance value of the MR head is measured through the resistance value detecting circuit in the inspection of the magnetic disk to compare the measured value with the initial value, and if the measured value is smaller than a predetermined value smaller than the initial value, or if the measured value is larger than a predetermined value larger than the initial value, it is determined that the head is deteriorated.

As described above, the resistance value detecting circuit that is directly coupled to the both terminals of the MR head is provided to measure the resistance value of the MR head, and the measured value is compared with the initial value of the exchanged head, so that it is possible to recognize a deterioration state of each head irrespective of the magnetic disk as the measurement target.

Accordingly, it is possible to decrease the number of times of exchanging the head due to deterioration, and to improve the throughput of the inspection by the magnetic inspection apparatus.

These and other objects, features and advantages of the invention will be apparent from the following more particular description of a preferred embodiment of the invention, as illustrated in the accompanying drawings.

DESCRIPTION OF THE PREFERRED EMBODIMENTS

Figure 1:
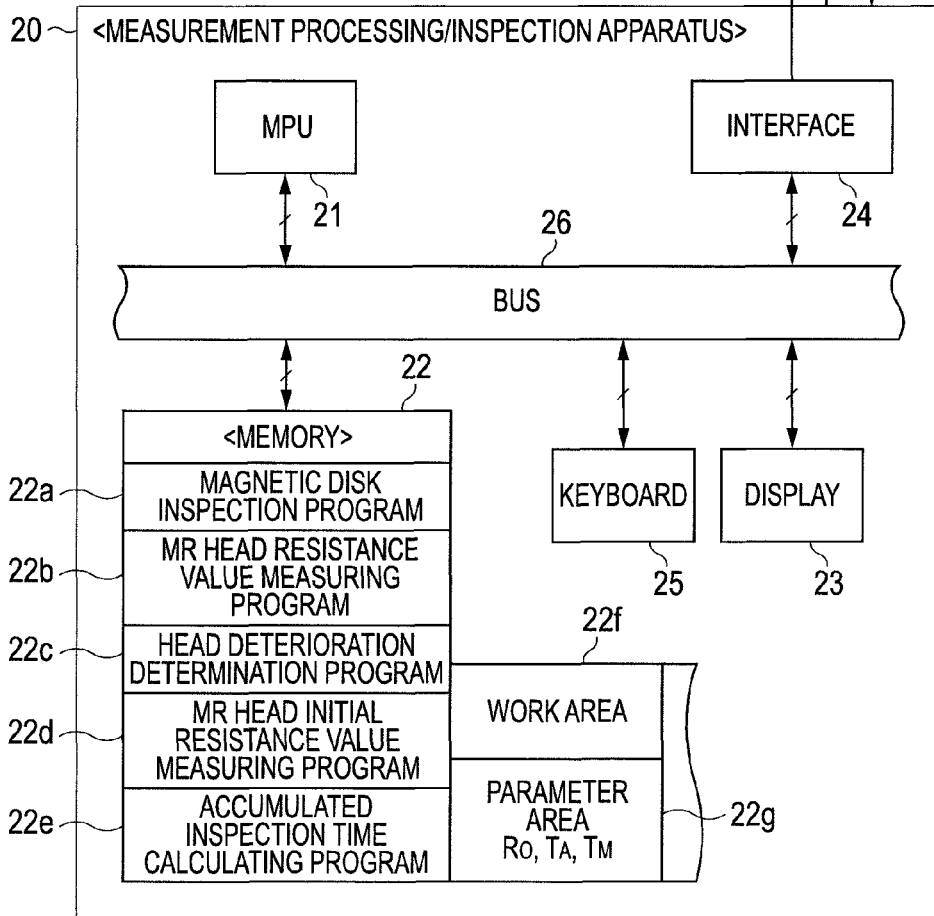
FIG. 1 is a block diagram of a magnetic disk inspection apparatus according to an embodiment in which a deterioration detection method of a head of the present invention is applied.

In FIG. 1, the reference numeral 10 denotes a magnetic disk inspection apparatus including a magnetic disk (hereinafter, referred to as a disk) 1, a spindle 2, a head 3, a reading/writing circuit (R/W IC chip) 4 incorporating an MR head resistance value detecting circuit, and a measurement processing/inspection apparatus 20. It should be noted that a circuit system used for an inspection of electric characteristics of the disk is not illustrated in the drawing. An MR head mounted in the head 3 in the embodiment is a TMR head or a GMR head.

The disk 1 is rotated by being attached to the spindle 2. A rotary encoder (not shown) is provided at the spindle 2 to generate an index signal IND (or sector signal SEC).

The head 3 is mounted in a head carriage, and is loaded to the disk 1. However, the head carriage is not illustrated in the drawing because the resistance value of the MR head is measured in a state (the position of the head shown by the solid line) where the head is located at a head load position (home position HP, see FIG. 1).

The head 3 is associated with a target track of the disk 1 to seek to the target track from a predetermined track or the head load position, and is stopped and positioned at the target track in a seek time that is set in association with the seek. In the inspection of the disk 1, test data with a predetermined frequency is written or read into/from the target track. FIG. 1 shows a state in which the head 3 located at the position shown by the dotted line is loaded to the disk 1.

The reference numerals 3a and 3b denote reading signal lines of the head 3 which are coupled to both terminals of the MR head of the head 3. It should be noted that on the side of the head 3, a reading amplifier 5a and a writing amplifier 5b are generally provided at a head arm of a head carriage or a base portion of a suspension spring located ahead of the head arm, or a reading/writing circuit (R/W IC chip) mounted in a head cartridge is provided. In FIG. 1, however, the reading/writing circuit 4 in which an MR head resistance value detecting circuit 9 is provided together with these circuits is integrated into one chip, and is mounted at the base portion of the suspension spring, the head arm of the head cartridge, or ahead of the head arm.

It should be noted that the reading/writing circuit 4 is shown outside the suspension spring in FIG. 1 for convenience of the explanation of the internal configuration.

The reading/writing circuit 4 includes the reading amplifier 4, the writing amplifier 5b, a current driving circuit 6, a voltage measuring circuit 7, and a parallel/serial conversion circuit 8. The current driving circuit 6, the voltage measuring circuit 7, and the parallel/serial conversion circuit 8 configure the MR head resistance value detecting circuit 9.

In order to inspect the magnetic disk, the reading amplifier 5a receives a reading signal from the MR head of the head 3 and transmits the same to a data reading circuit 11. The writing amplifier 5b receives test data from a data writing circuit 12 to generate a writing signal, and outputs the writing signal to a thin-film inductive head (write head) of the head 3. The data reading circuit 11 is coupled to the measurement processing/inspection apparatus 20 and the data writing circuit 12 is coupled to the measurement processing/inspection apparatus 20 through a test data generating circuit 13.

The current driving circuit 6 includes a D/A conversion circuit (D/A) 6a, a current output-type OP amplifier 6b, and a current inversion-type OP amplifier 6c, and the D/A 6a receives command current data from the parallel/serial conversion circuit 8. The current output-type OP amplifier 6b receives a command current value output from the D/A 6a in accordance with the command current data, and output current amplified in accordance with the command current value is discharged from the current output-type OP amplifier 6b. The discharged output current is applied to the MR head of the head 3 through the reading signal line 3a, and the current flowing into the MR head is sunk in the current inversion-type OP amplifier 6c of the current driving circuit 6 through the reading signal line 3b.

The voltage detecting circuit 7 includes an A/D conversion circuit (A/D) 7a and a high input impedance OP amplifier 7b. The input side of the A/D 7a is coupled to the reading signal line 3a and the reading signal line 3b, and a voltage signal in accordance with voltage between the lines is output to the A/D 7a as a measurement signal. The A/D 7a converts the measurement signal into a digital value to be transmitted to the parallel/serial conversion circuit 8.

The parallel/serial conversion circuit 8 serially receives the command current data from the measurement processing/inspection apparatus 20, and converts the data in parallel for transmission to the D/A 6a. The parallel/serial conversion circuit 8 receives the voltage measurement signal converted into the digital value from the A/D 7a to be transmitted to the measurement processing/inspection apparatus 20.

The measurement processing/inspection apparatus 20 includes an MPU 21, a memory 22, a display 23, an interface 24, a keyboard 25 and the like which are coupled to each other through a bus 26. The interface 24 is coupled to the parallel/serial conversion circuit 8 through three coupling lines of data DATA, a clock CLK, and an ENABLE, and data is transmitted and received to/from the MPU 21 through the three lines and the bus 26.

A magnetic disk inspection program 22a, an MR head resistance value measuring program 22b, a head deterioration determination program 22c, an MR head initial resistance value measuring program 22d, and an accumulated inspection time calculating program 22e are stored in the memory 22. Further, a work area 22f and a parameter area 22g for storing parameters used for measurement are provided.

When the magnetic disk inspection program 22a runs on the MPU 21 by inputting a predetermined function key, the MPU 21 calls the MR head resistance value measuring program 22b to run when the inspection of the disk 1 is started. At this time, the head 3 is located at the head load position (home position HP).

When the MR head resistance value measuring program 22b runs on the MPU 21, the MPU 21 transmits current value command data for setting a head current value to the current driving circuit 6 through the interface 24. The current value applied to the MR head of the head 3 at this time is a current value I at the time of data reading. At this time, the MPU 21 obtains a voltage value V measured by the voltage detecting circuit 7 through the interface 24 to be stored into the work area 22f, and calculates a resistance value R when the inspection of the MR head is started using R=V/I to be stored into the work area 22f. Then, the MPU 21 calls the head deterioration determination program 22c.

When the head deterioration determination program 22c runs on the MPU 21, the MPU 21 compares the measured resistance value R with an MR head initial value R0 at the time of exchanging the head that is stored in the parameter area 22g to determine whether or not $\{(R-R0)/R0\} \times 100$ falls within a range of ±20%. When the obtained value is out of the range, the MPU 21 determines that the head 3 is deteriorated, and displays an instruction (alarm) of an exchange of the head on the display 23 to stop the inspection process of the magnetic disk.

It should be noted that the instruction of an exchange of the head may be generated using an alarm by sound or light emission, instead of displaying on the display 23.

If the result of the determination shows that the measured resistance value R falls within a range of ±20%, it is determined whether or not an up-to-date accumulated inspection time TA of the head 3 stored in the parameter area 22g is larger than a limit value TM. If the accumulated inspection time TA is larger than the limit value TM, the MPU 21 determines that the head is deteriorated, and displays an instruction of an exchange of the head on the display 23 to stop the inspection process of the magnetic disk.

By inputting a predetermined function key when the exchange of the head is completed, the MR head initial resistance value measuring program 22d runs on the MPU 21. When the MR head initial resistance value measuring program 22d runs on the MPU 21, the MPU 21 calls the MR head resistance value measuring program 22b to calculate the resistance value R at the time of exchanging the MR head, and stores the resistance value R into a predetermines area of the parameter area 22g as the initial resistance value R0. Then, the MPU 21 resets the accumulated inspection time TA stored in the predetermined area of the parameter area 22g to 0.

On the other hand, if it is determined that the head is not deteriorated, the MPU 21 calls the accumulated inspection time calculating program 22e prior to the inspection of the disk to run by task processing, and starts to inspect the disk 1.

At this time, the MPU 21 allows the accumulated inspection time calculating program 22e to run, and accumulates a head access time from the time when the inspection of the disk 1 is started to the time when the inspection is completed. The MPU 21 adds the calculated accumulation time to the accumulated inspection time TA stored in the parameter area 22g to update the accumulated inspection time TA.

It should be noted that when the access time in the inspection of one disk is substantially constant, the accumulated inspection time TA may be updated when the inspection of the disk is started or after the inspection is completed.

Incidentally, the resistance value of the MR head is measured when the inspection of the disk is started in the embodiment. However, the MPU 21 calls the MR head resistance value measuring program 22b to run when retrying during the inspection, and the resistance value of the MR head may be measured to determine the deterioration of the head. Especially, since the retry starts when a reading error by the head 3 occurs, there is a high possibility that the resistance value of the MR head is decreased. The resistance value of the MR head is measured to stop the inspection at this time, and the yield rate of the disk can be accordingly improved.

Figure 2A:
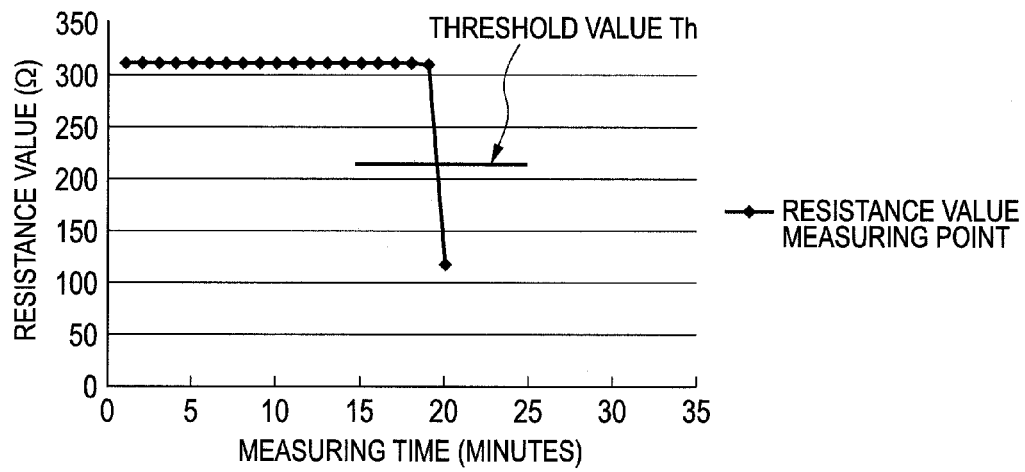
FIG. 2 are characteristic graphs, each showing changes of a continuous measuring time and the resistance value of an MR head in an inspection state.
Figure 2B:
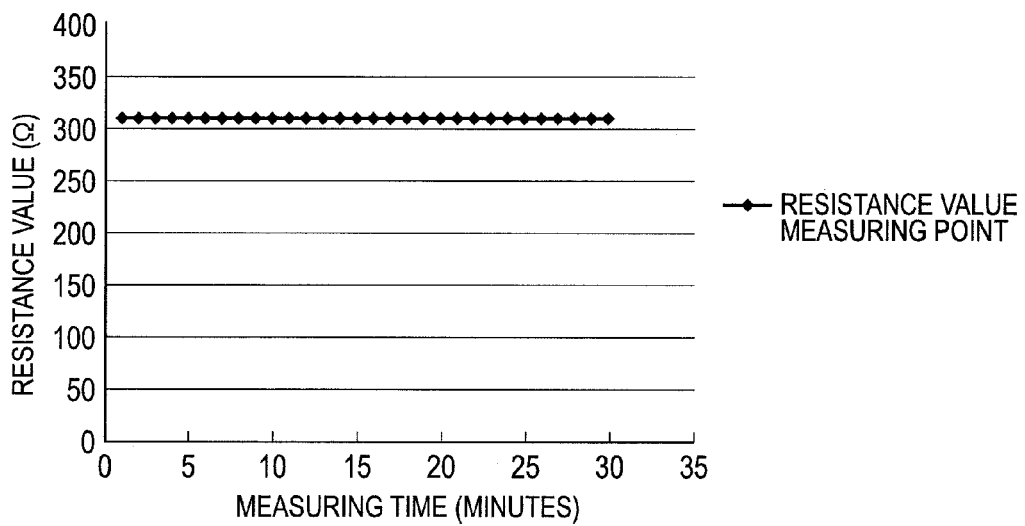

FIGS. 2A and 2B are characteristic graphs, each showing changes of a continuous measuring time and the resistance value of the MR head in an inspection state.

FIG. 2A shows characteristics of the head whose quality of production is poor, and shows an example in which a continuous measuring time is about 20 minutes and the resistance value of the MR head is deteriorated at a time due to contact or collision of the head with the disk.

It should be noted that the resistance value of the TMR head or the GMR head being used is about 310Ω in an initial state.

FIG. 2B shows characteristics of the head whose quality of production is excellent, and the resistance value of the MR head is hardly decreased in a continuous measuring time of about 30 minutes. In a normal case, the head 3 can be used for about two to three weeks, and thereafter, the resistance value drastically starts to decrease.

In general, the state of the head 3 shown in FIG. 2B is drastically changed to that shown in FIG. 2A.

On the assumption that the inspection time for one disk is a few minutes and a determination criterion is set at around 210Ω shown by a threshold value Th, if the head is exchanged at 210Ω or higher, the inspection of the disk can be carried out without any problem.

As shown FIG. 2A, the resistance value is decreased during a few minutes of disk inspection. Accordingly, it is desirable to exchange the head when the initial resistance value is 310Ω and it is decreased to 250Ω in consideration of safety.

In an example using the measurement value, 20% can be obtained as a determination limit value using $\{(310-250/300)\} \times 100$.

Further, the deterioration of the head 3 is caused by a decrease in the resistance value in many cases. Aside from this, there are some heads deteriorated tend to disconnection. As a range limit, a determination limit value of ±20% is set to determine the deterioration, too, tend to disconnection in the embodiment.

Figure 3:
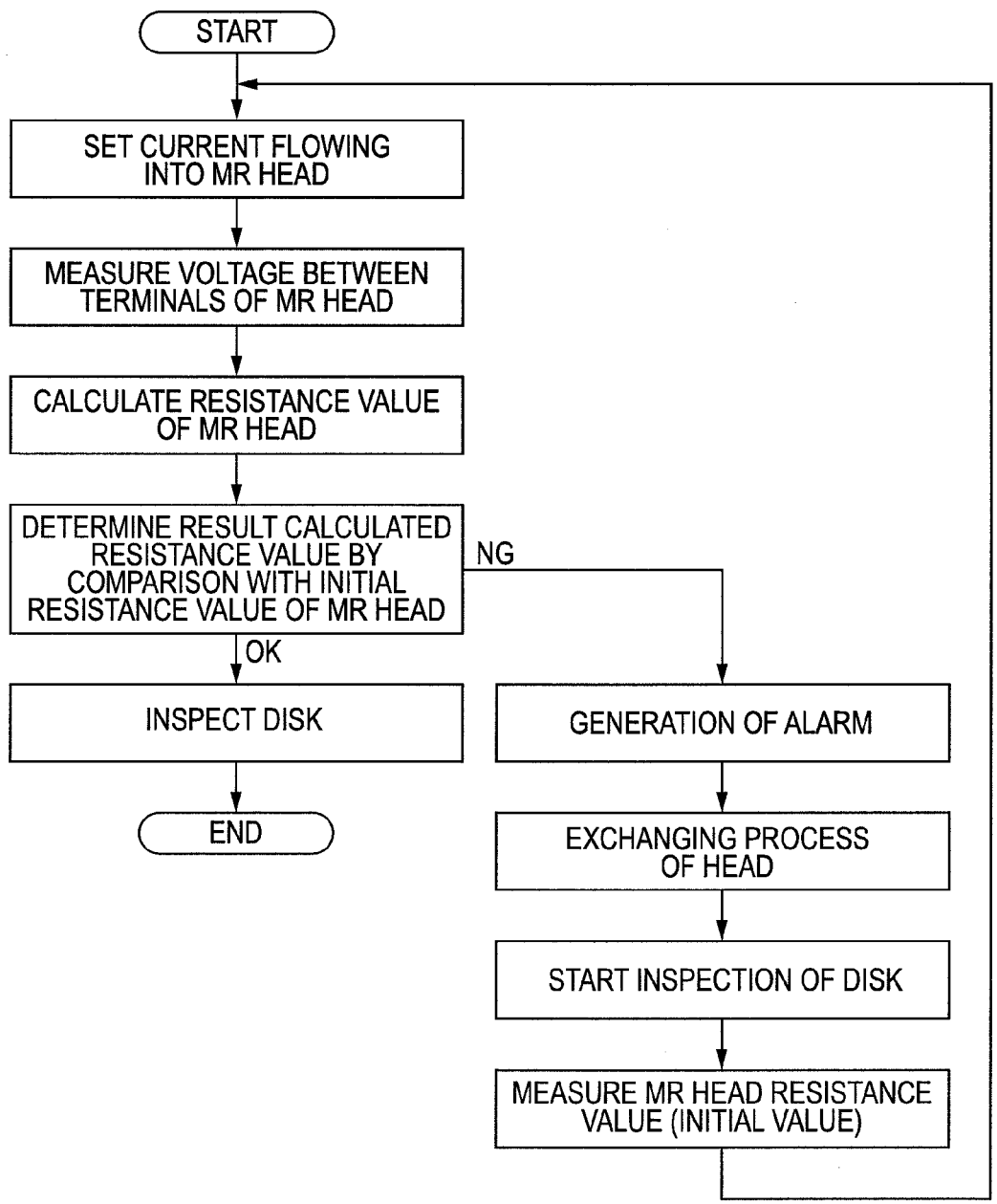
FIG. 3 shows a flowchart of a process for determination of deterioration of the head and an exchange of the head.

FIG. 3 shows a flowchart of a process for determination of the deterioration of the head and an exchange of the head.

In the flowchart of FIG. 3, determination whether or not the resistance value of the MR head is acceptable is mainly shown, and the accumulated inspection time TA and the determination thereof are omitted.

A measurement process for measuring the resistance value of the MR head is a simple process in which the respective processing programs are sequentially executed, and thus the detailed explanation of the flowchart in FIG. 3 will be omitted.

As described above, the determination limit value is set at ±20% in the embodiment. However, the determination limit value slightly differs depending on the characteristics, materials, shapes, and manufacturing processes of the head. Thus, it is preferable to select the determination limit value in accordance with changed characteristics by actually measuring the resistance value of the MR head.

Accordingly, the determination limit value of the present invention is not limited to ±20%. In addition, the disconnection of the MR head is less likely to happen. Thus, the disconnection of the MR head can be detected by conventional error detection, or can be eliminated by periodically exchanging the head. In the present invention, the deterioration of the head may be determined using only a limit value (predetermined value) on the decreased side of the resistance value smaller than the initial value, or using only a limit value (predetermined value) on the increased side of the resistance value larger than the initial value.

Further, the resistance value of the MR head is measured when the inspection of the disk is started or retried in the embodiment. However, it is obvious that the deterioration of the head may be determined by measuring the resistance value of the MR head when the inspection of the disk is completed or after the inspection is completed in the present invention.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description and all changes which come within the meaning and range of equivalency of the clams are therefore intended to be embraced therein.

What is claimed is:

1. A deterioration detection method of a composite magnetic head having an MR (magnetoresistance effect) head as a read head in a magnetic disk inspection apparatus, the method comprising:

detecting a resistance value of the MR head, wherein the resistance value is detected by a resistance value detecting circuit coupled to both terminals of the MR head; and measuring the resistance value of the MR head of the exchanged composite magnetic head through the resistance value detecting circuit, and storing a measured value into a memory as an initial value, wherein the resistance value of the MR head is measured through the resistance value detecting circuit in the inspection of the magnetic disk to compare the measured value with the initial value, and if the measured value is smaller than a predetermined value smaller than the initial value, or if the measured value is larger than a predetermined value larger than the initial value, it is determined that the head is deteriorated, wherein the resistance value of the MR head in the inspection of the magnetic disk is measured when the inspection of the magnetic disk is started by the magnetic disk inspection apparatus, when the inspection is retried during the inspection, when the inspection of the magnetic disk is completed, or after the inspection of the magnetic disk is completed, wherein the resistance value detecting circuit is provided at a reading/writing circuit of the magnetic disk inspection apparatus having a writing amplifier coupled to a writing head of the composite magnetic head and a reading amplifier coupled to the MR head, it is determined whether or not $\{(R-R0)/R0\}\times100$ falls within a range of 20% where the measured initial value is R0 and the resistance value measured in the inspection of the magnetic disk is R, and it is determined if the measured value is smaller than a predetermined value smaller than the initial value, or if the measured value is larger than a predetermined value larger than the initial value.

2. The deterioration detection method of a composite magnetic head according to claim 1, wherein the resistance value detecting circuit includes a current driving circuit for outputting current with a predetermined current value to the MR head and a voltage detecting circuit for detecting the voltage of both terminals of the MR head, and is provided at or ahead of a head arm of a head carriage of the magnetic disk inspection apparatus.

3. A magnetic disk inspection apparatus including the deterioration detection method of a composite magnetic head according to claim 2.

4. A magnetic disk inspection apparatus outputting an instruction of an exchange of the head by displaying on a screen or generating an alarm when it is determined by the deterioration detection method of a composite magnetic head according to claim 2 that the head is deteriorated.

5. A magnetic disk inspection apparatus including the deterioration detection method of a composite magnetic head according to claim 1.

6. A magnetic disk inspection apparatus including the deterioration detection method of a composite magnetic head according to claim 1.

7. A magnetic disk inspection apparatus including the deterioration detection method of a composite magnetic head according to claim 1.

8. A magnetic disk inspection apparatus outputting an instruction of an exchange of the head by displaying on a screen or generating an alarm when it is determined by the deterioration detection method of a composite magnetic head according to claim 1 that the head is deteriorated.

9. A magnetic disk inspection apparatus outputting an instruction of an exchange of the head by displaying on a screen or generating an alarm when it is determined by the deterioration detection method of a composite magnetic head according to claim 1 that the head is deteriorated.

10. A magnetic disk inspection apparatus outputting an instruction of an exchange of the head by displaying on a screen or generating an alarm when it is determined by the deterioration detection method of a composite magnetic head according to claim 1 that the head is deteriorated.

* * * * *